United States Patent
Chun et al.

(10) Patent No.: US 10,623,990 B2
(45) Date of Patent: Apr. 14, 2020

(54) USER EQUIPMENT AND METHOD FOR TRANSMITTING DATA, AND NETWORK NODE AND METHOD FOR RECEIVING DATA

(71) Applicant: LG ELECTRONICS INC., Seoul (KR)

(72) Inventors: Sungduck Chun, Seoul (KR); Jinsook Ryu, Seoul (KR); Taehun Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/062,835

(22) PCT Filed: Dec. 14, 2016

(86) PCT No.: PCT/KR2016/014642
§ 371 (c)(1),
(2) Date: Jun. 15, 2018

(87) PCT Pub. No.: WO2017/105077
PCT Pub. Date: Jun. 22, 2017

(65) Prior Publication Data
US 2019/0028925 A1  Jan. 24, 2019

Related U.S. Application Data

(60) Provisional application No. 62/267,284, filed on Dec. 15, 2015.

(51) Int. Cl.
*H04W 28/06* (2009.01)
*H04W 28/04* (2009.01)
(Continued)

(52) U.S. Cl.
CPC .......... *H04W 28/06* (2013.01); *H04L 1/0072* (2013.01); *H04L 29/06* (2013.01); *H04L 69/04* (2013.01);
(Continued)

(58) Field of Classification Search
CPC . H04W 28/04; H04W 28/06; H04W 12/0017; H04W 4/70; H04W 80/04;
(Continued)

(56) References Cited

U.S. PATENT DOCUMENTS 8,699,711 B2  4/2014 Mukherjee et al.
2002/0093938 A1  7/2002 Tourunen
(Continued)

FOREIGN PATENT DOCUMENTS

JP  WO2016056122  4/2017

OTHER PUBLICATIONS

PCT International Application No. PCT/KR2016/014642, Written Opinion of the International Searching Authority dated Mar. 29, 2017, 37 pages.
(Continued)

*Primary Examiner* — Joshua Kading
(74) *Attorney, Agent, or Firm* — Lee Hong Degerman Kang Waimey

(57) ABSTRACT

User data having a compressed header is transmitted as a non-access stratum (NAS) message from a user equipment to a network node. The network node decompresses the compressed header and provides a result of the header decompression to the user equipment.

16 Claims, 13 Drawing Sheets

(51) Int. Cl.
  *H04L 1/00* (2006.01)
  *H04W 12/00* (2009.01)
  *H04L 29/08* (2006.01)
  *H04L 29/06* (2006.01)
  *H04W 80/04* (2009.01)
  *H04W 4/70* (2018.01)

(52) U.S. Cl.
  CPC ............ *H04L 69/22* (2013.01); *H04L 69/325* (2013.01); *H04W 12/0017* (2019.01); *H04W 28/04* (2013.01); *H04W 4/70* (2018.02); *H04W 80/04* (2013.01)

(58) Field of Classification Search
  CPC ....... H04L 69/04; H04L 69/22; H04L 69/325; H04L 1/0072; H04L 29/06; H04L 29/0604; H04L 29/08783; H04L 29/08792; H04L 47/365
  See application file for complete search history.

(56) References Cited

U.S. PATENT DOCUMENTS

| | | | | |
|---|---|---|---|---|
| 2004/0039830 | A1* | 2/2004 | Zhang | H04L 69/04 709/230 |
| 2007/0195764 | A1* | 8/2007 | Liu | H04W 28/24 370/389 |
| 2008/0151861 | A1 | 6/2008 | Zhang | |
| 2010/0195617 | A1 | 8/2010 | Park et al. | |
| 2010/0322151 | A1 | 12/2010 | Racz et al. | |
| 2011/0019617 | A1* | 1/2011 | Ho | H04W 28/06 370/328 |
| 2012/0155375 | A1* | 6/2012 | Zhu | H04B 7/155 370/315 |
| 2013/0315209 | A1* | 11/2013 | Murakami | H04W 28/065 370/331 |
| 2015/0195850 | A1* | 7/2015 | Quan | H04L 1/18 370/329 |

OTHER PUBLICATIONS

European Patent Office Application Serial No. 16876019.7, Search Report dated Jun. 24, 2019, 9 pages.
3rd Generation Partnership Project (3GPP), "Technical Specification Group Services and System Aspects; Architecture enhancements for Cellular Internet of Things (Release 13)," 3GPP TR 23.720 V1.2.0, Nov. 2015, 96 pages.

* cited by examiner

FIG. 5
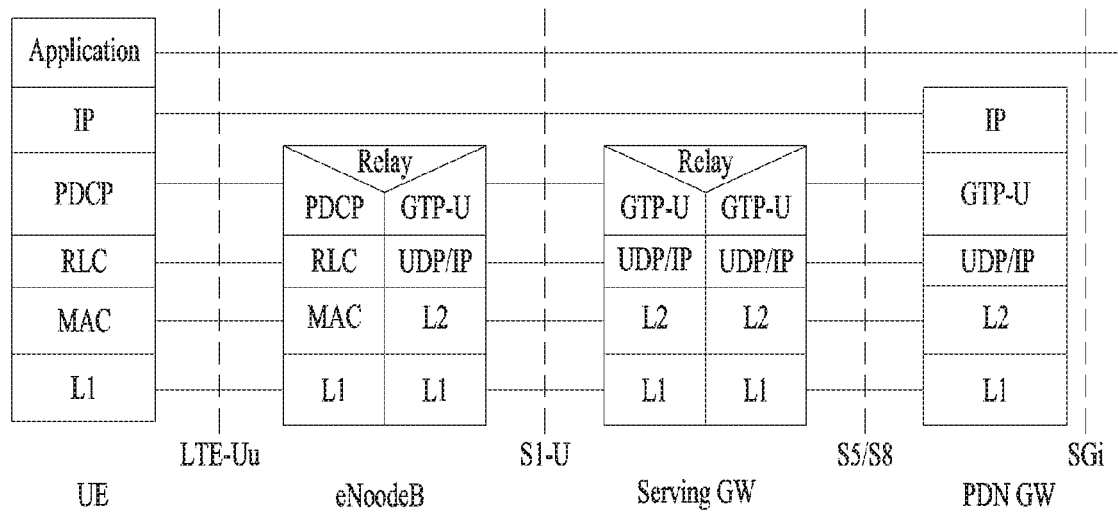
(a) UE-P-GW user plane with E-UTRAN
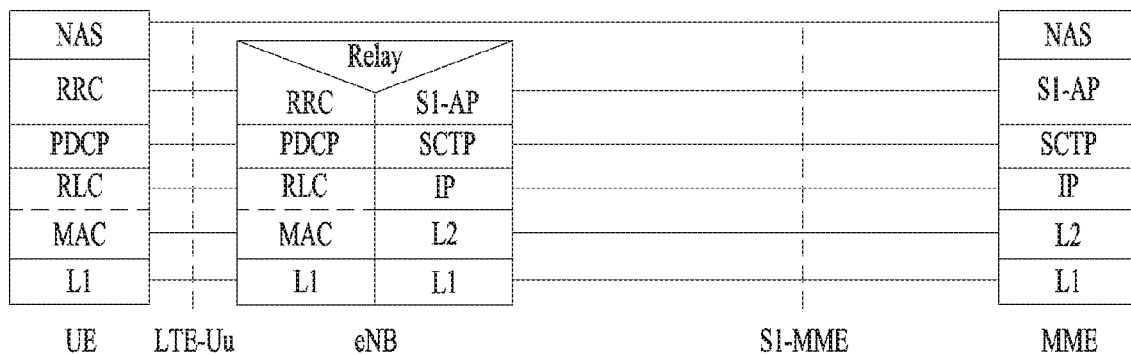
(b) Control Plane UE-MME

USER EQUIPMENT AND METHOD FOR TRANSMITTING DATA, AND NETWORK NODE AND METHOD FOR RECEIVING DATA

CROSS-REFERENCE TO RELATED APPLICATIONS

This application is the National Stage filing under 35 U.S.C. 371 of International Application No. PCT/KR2016/014642, filed on Dec. 14, 2016, which claims the benefit of U.S. Provisional Application No. 62/267,284, filed on Dec. 15, 2015, the contents of which are all hereby incorporated by reference herein in their entirety.

TECHNICAL FIELD

The present invention relates to a wireless communication system, and more particularly, to a method and apparatus for transmitting/receiving data.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With the development of smart devices, a new method for efficiently transmitting/receiving a small amount of data or infrequently occurring data is required.

The technical objects that can be achieved through the present invention are not limited to what has been particularly described hereinabove and other technical objects not described herein will be more clearly understood by persons skilled in the art from the following detailed description.

Technical Solution

According to the present invention, user data with a compressed header is transmitted from a user equipment (UE) to a network node in a non-access stratum (NAS) message. The network node performs header decompression of the compressed header and provides a result of the header decompression to the UE.

In an aspect of the present invention, provided herein is a user equipment (UE) for transmitting data in a wireless communication system, including: a radio frequency (RF) unit; and a processor configured to control the RF unit. In this case, the processor may be configured to: control the RF unit to transmit user data with a compressed header in a non-access stratum (NAS) message; control the RF unit to receive a response indicating failure of header decompression of the compressed header; and if the response is received, control the RF unit to transmit a full header.

In another aspect of the present invention, provided herein is a network node for receiving data in a wireless communication system, including: a radio frequency (RF) unit; and a processor configured to control the RF unit. In this case, the processor may be configured to: control the RF unit to receive, from a user equipment (UE), user data with a compressed header in a non-access stratum (NAS) message; control the RF unit to perform header decompression of the compressed header; if no error occurs during the header decompression, control the RF unit to transmit the user data to a serving gateway (S-GW); and if an error occurs during the header decompression, control the RF unit to transmit a response indicating failure of the header decompression to the UE instead of transmitting the user data to the S-GW.

In a further aspect of the present invention, provided herein is a method for transmitting data by a user equipment (UE) in a wireless communication system, including: transmitting user data with a compressed header in a non-access stratum (NAS) message; receiving a response indicating failure of header decompression of the compressed header; and if the response is received, transmitting a full header.

In a still further aspect of the present invention, provided herein is a method for receiving data by a network node in a wireless communication system, including: receiving, from a user equipment (UE), user data with a compressed header in a non-access stratum (NAS) message; performing header decompression of the compressed header; if no error occurs during the header decompression, transmitting the user data to a serving gateway (S-GW); and if an error occurs during the header decompression, transmitting a response indicating failure of the header decompression to the UE instead of transmitting the user data to the S-GW.

In each aspect of the present invention, the response may be transmitted in the form of a NAS message or cause value defined for indicating the failure of the header decompression.

In each aspect of the present invention, the NAS message carrying the user data may be a Service Request message, and the response may be included in a Service Reject message.

In each aspect of the present invention, the Service Reject message may further include a cause value indicating the failure of the header decompression in addition to a cause value for service rejection.

In each aspect of the present invention, the user data may be transferred from an evolved session management (ESM) entity of the UE to an evolved packet system mobility management (EMM) entity of the UE, and the user data may be included in the NAS message by the EMM entity.

In each aspect of the present invention, the full header may be transmitted with new user data.

In each aspect of the present invention, the compressed header may be generated by a NAS layer of the UE based on a header compression protocol.

In each aspect of the present invention, the header compression protocol may be a robust header compression (RoHC) protocol.

In each aspect of the present invention, the network node may be a mobility management entity (MME).

In each aspect of the present invention, the header decompression may be performed by a NAS layer of the MME based on a header compression protocol.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, a low-complexity/low-cost UE can communicate with the network while maintaining backward compatibility with the legacy system.

According to an embodiment of the present invention, it is possible to implement a low-complexity/low-cost UE.

According to an embodiment of the present invention, a UE can communicate with the network in narrowband.

According to an embodiment of the present invention, a small amount of data can be efficiently transmitted/received.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram illustrating LTE (Long Term Evolution) protocol stacks for a user plane and a control plane.

MODE FOR CARRYING OUT THE INVENTION

Figure 1:
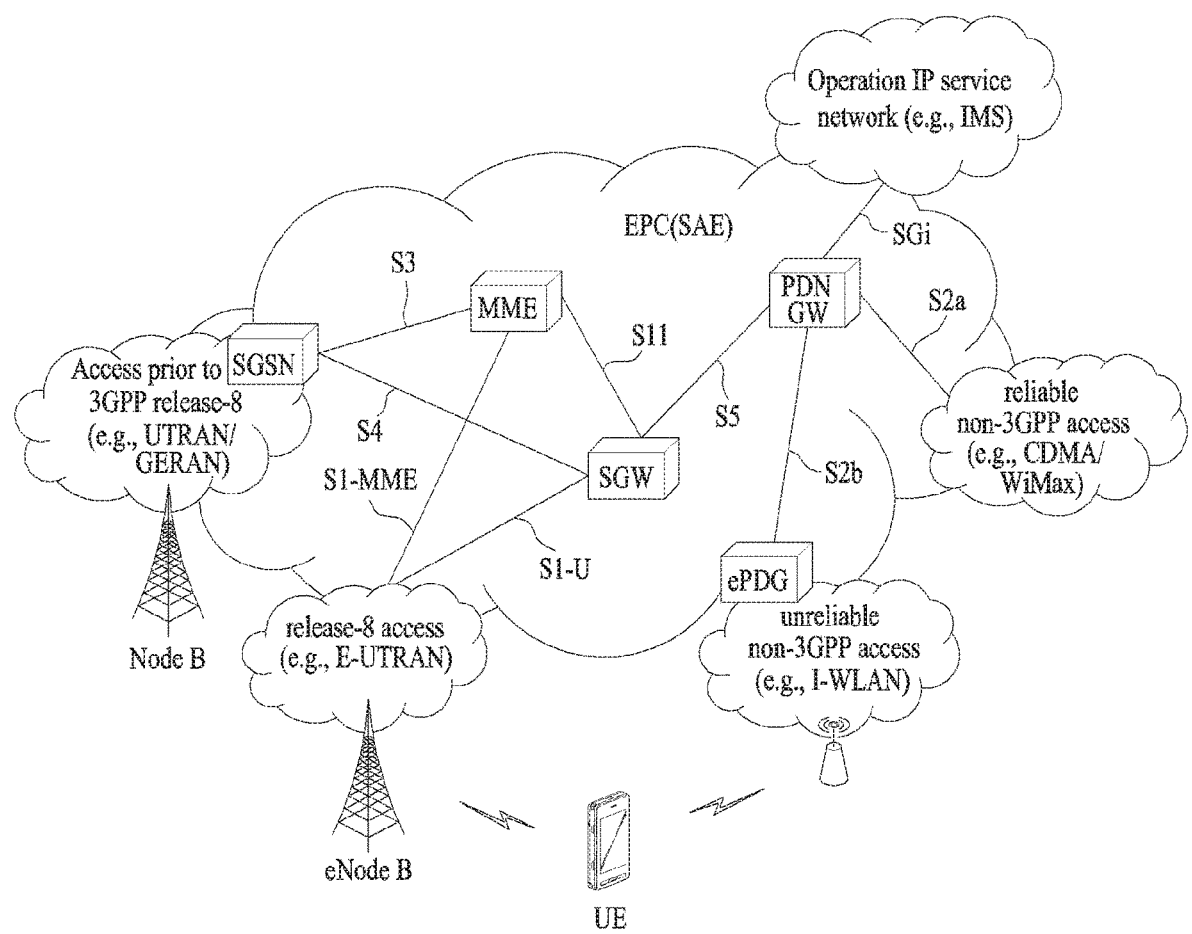
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, and 3GPP TS 36.413 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC devic.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS (Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
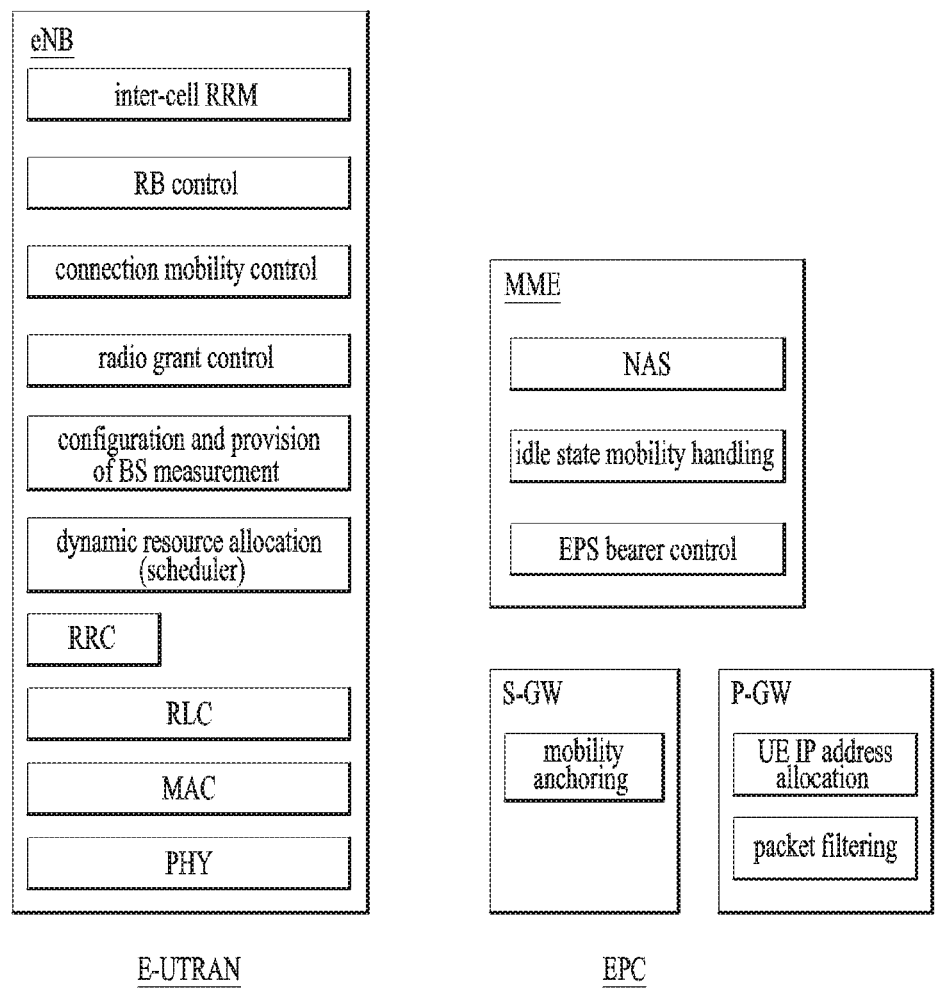
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
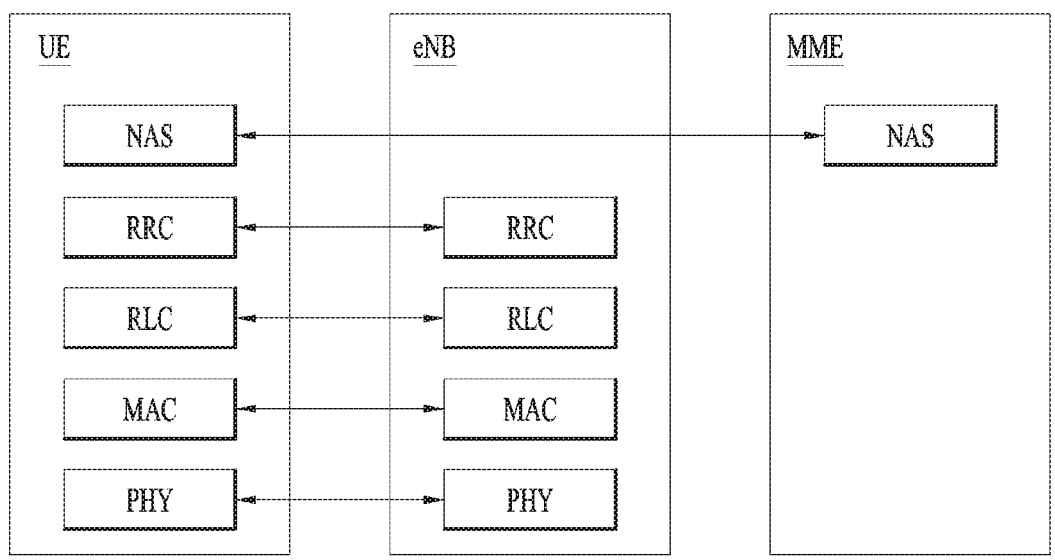
FIG. 3 is a diagram exemplarily illustrating the structure of a radio interface protocol in a control plane.
Figure 4:
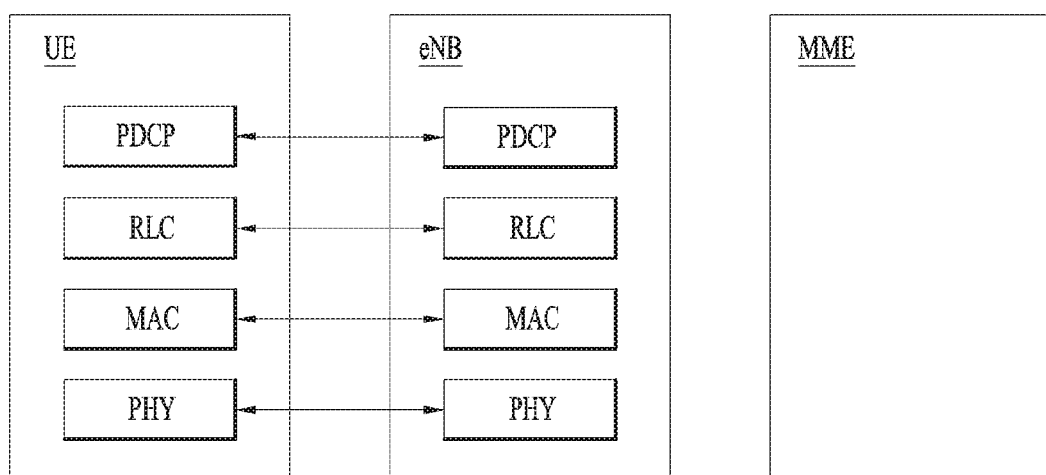
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
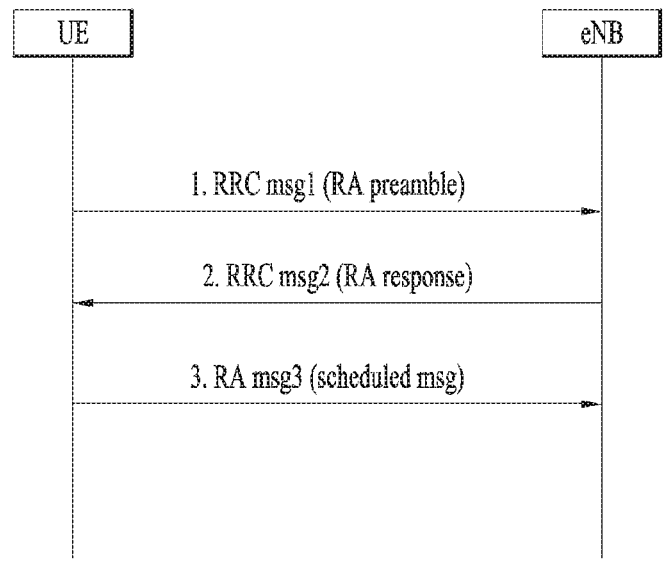
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
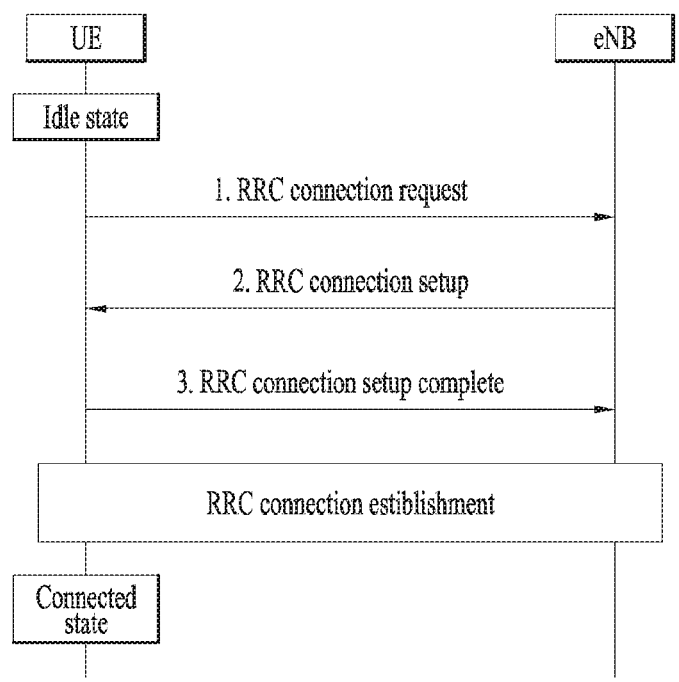
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In order for the UE of an idle state to transition to an activation state in which traffic transmission/reception can be performed due to occurrence of new traffic, a service request procedure is performed. If traffic to be transmitted by the UE occurs or traffic to be transmitted to the UE by a network occurs in a state in which the UE is registered with the network but an S1 connection is released and a wireless resource is not allocated to the UE due to traffic inactivation, i.e., in a state in which the UE is in an EMM registered state (EMM-Registered) but is in an ECM-Idle state, the UE requests that the network provide a service. Upon successfully completing the service request process, the UE transitions to an ECM connected state (ECM-Connected) and configures an ECM connection (RRC connection+S1 signaling connection) in a control plane and an E-RAB (a data radio bearer (DRB) and an S1 bearer) in a user plane, thereby transmitting/receiving traffic. If the network desires to transfer traffic to the UE of an ECM idle state (ECM-Idle), the network informs the UE, through a paging message, that there is traffic to be transmitted so that the UE may request that the network provide a service.

Hereinafter, a network triggered service request procedure will be described in brief. If an MME has or needs to transmit downlink data or signals to an UE in the ECM-IDLE state, for example, if the MME needs to perform the MME/HSS-initiated detach procedure for the ECM-IDLE mode UE or an S-GW receives control signaling (e.g. Create Bearer Request or Modify Bearer Request), the MME starts the network triggered service request procedure. When the S-GW receives Create Bearer Request or Modify Bearer Request for a UE in the state that ISR is activated, the S-GW does not have a downlink S1-U, and an SGSN has notified the S-GW that the UE has moved to an PMM-IDLE or STANDBY state, the S-GW buffers signaling messages and transmits Downlink Data Notification to trigger the MME and SGSN to page the UE. If the S-GW is triggered to send second Downlink Data Notification for a bearer with higher priority (i.e. ARP priority level) than that for which the first Downlink Data Notification was sent while waiting for the user plane to be established, the S-GW sends a new Downlink Data Notification message indicating the higher priority to the MME. If the S-GW receives additional downlink data packets for a bearer with same or higher priority than that for which the first Downlink Data Notification was sent, or if after sensing a second Downlink Data Notification message indicating the higher priority, the S-GW receives additional downlink data packets for the UE, the S-GW buffers these downlink data packets and does not send new Downlink Data Notification. The S-GW will be notified about the current RAT type based on a UE triggered service request procedure. In addition, the S-GW will keep executing a dedicated bearer activation or dedicated bearer modification procedure. That is, the S-GW will send corresponding buffered signaling to the MME or SGSN where UE resides in now and inform a P-GW of the current RAT type if the RAT type has been changed compared to the last reported RAT Type. If dynamic PCC is deployed, the current RAT type information can be conveyed from the P-GW to a PCRF. If PCRF response leads to EPS bearer modification, the P-GW initiates a bearer update procedure. When sending the Downlink Data Notification, the S-GW includes both an EPS bearer ID and ARP. If the Downlink Data Notification is triggered by the arrival of downlink data packets at the S-GW, the S-GW includes an EPS bearer ID and ARP associated with the bearer through which the downlink data packet was received. If the Downlink Data Notification is triggered by the arrival of control signaling and if the control signaling includes an EPS bearer ID and ARP, the S-GW includes the corresponding EPS bearer ID and APR. If the ARP is not present in the control signaling, the S-GW includes an ARP in a stored EPS bearer context. When an L-GW receives downlink data for a UE in the ECM-IDLE state, if a LIPA PDN connection exists, the L-GW sends the first downlink user packet to the S-GW and buffers all other downlink user packets. The S-GW triggers the MME to page the UE. Details of the network triggered service request procedure can be found in section 5.3.4.3 of 3GPP TS 23.401.

Figure 8:
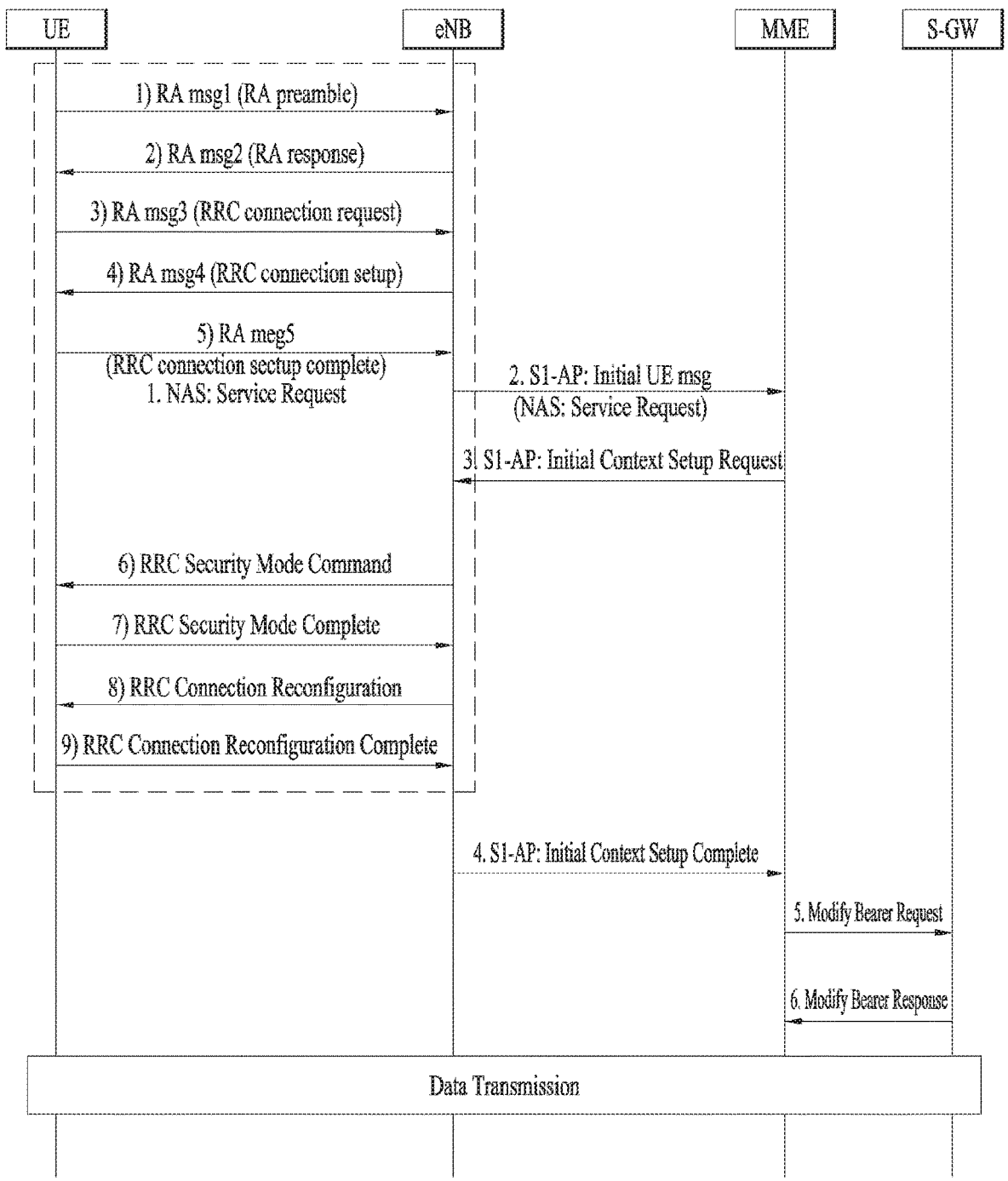
FIG. 8 illustrates a UE triggered Service Request procedure.

FIG. 8 illustrates a UE triggered service request procedure.

Referring to FIG. 8, when a UE has traffic to be transmitted, the UE sends to an eNB an RRC connection request through a random access procedure, that is, by performing steps 1) to 3). When the eNB accepts the RRC connection request from the UE, the eNB sends an RRC Connection Setup message to the UE. Upon receiving the RRC Connection Setup message, the UE sends an RRC Connection Setup Complete message to the eNB by including a service request in the message. This will be described in detail with respect to a service request between a UE and MME.

1. The UE sends NAS message Service Request towards the MME encapsulated in an RRC message (e.g. RA msg5 of FIG. 8) to the eNB.
2. The eNB forwards NAS message to MME. NAS message is encapsulated in an S1-AP.
3. The MME sends an S1-Ap Initial Context Setup Request message to the eNB. In this step, radio and S1 bearers are activated for all activate EPS bearers. The eNB stores a security context, MME signaling connection ID, EPS bearer QoS(s), etc. in a UE context.

The eNB performs a radio bearer establishment procedure. The radio bearer establishment procedure includes steps 6) to 9) illustrated in FIG. 8.

4. The eNB sends S1-AP message Initial Context Setup Request to the MME.
5. The MME sends a Modify Bearer Request message for each PDN connection to an S-GW.

The S-GW returns Modify Bearer Response to the MME in response to the Modify Bearer Request message.

Thereafter, traffic is transmitted/received via the E-RAB established through the service request procedure.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support UT' devices characterized as ultra-low complexity, power limitation and low data rates.

In the prior art, an EMM-Idle mode UE should establish a connection with the network to transmit data. To this end, the UE should successfully complete the service request procedure illustrated in FIG. 8, but it is not suitable for the CIoT that requires optimized power consumption for the low data rate. To transmit data to an application, two types of optimization: User Plane CIoT EPS optimization and Control Plane CIoT EPS optimization has been defined for the CIoT in the EPS.

The User Plane CIoT EPS optimization and Control Plane CIoT optimization can be referred to U-plane CIoT EPS optimization and C-plane CIoT EPS optimization, respectively.

Figure 9:
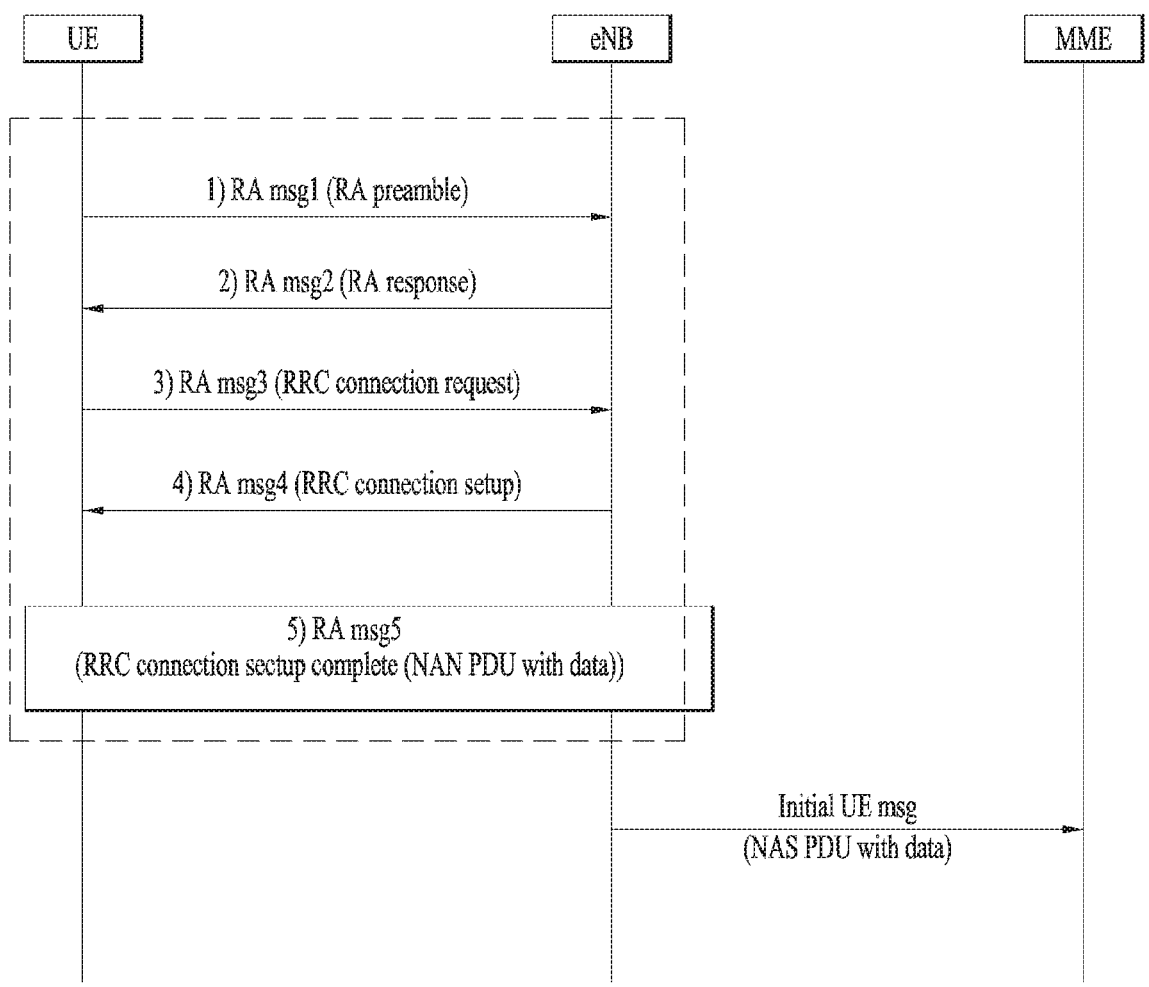
FIG. 9 illustrates in brief a data transfer procedure in accordance with Control Plane CIoT EPS optimization regarding radio signals.

FIG. 9 illustrates in brief a data transfer procedure in accordance with Control Plane CIoT EPS optimization regarding radio signals.

In the Control Plane CIoT EPS optimization, uplink (UL) data is transferred from an eNB (CIoT RAN) to an MME. Thereafter, the UL data may be transmitted from the MME to a P-GW through an S-GW. Through these nodes, the UL data is forwarded to an application server (i.e., CIoT services). DL data is transmitted through the same path in the opposite direction. In the case of a Control Plane CIoT EPS optimization solution, there is no setup data radio bearer, but data packets are transmitted through signaling bearers. Thus, this solution is most suitable for transmission of infrequent small data packets.

When a UE and MME use the Control Plane CIoT EPS optimization, the UE and MME may transfer IP or non-IP data through NAS signaling depending on data types selected for a PDN connection supported at PDN connection establishment.

The Control Plane CIoT EPS optimization can be achieved by using NAS transport capabilities of RRC and S1-AP protocols and data transfer through GTP (Evolved General Packet Radio Service (GPRS) Tunneling Protocol) tunnels between an MME and an S-GW and between an S-GW and a P-GW.

Figure 10:
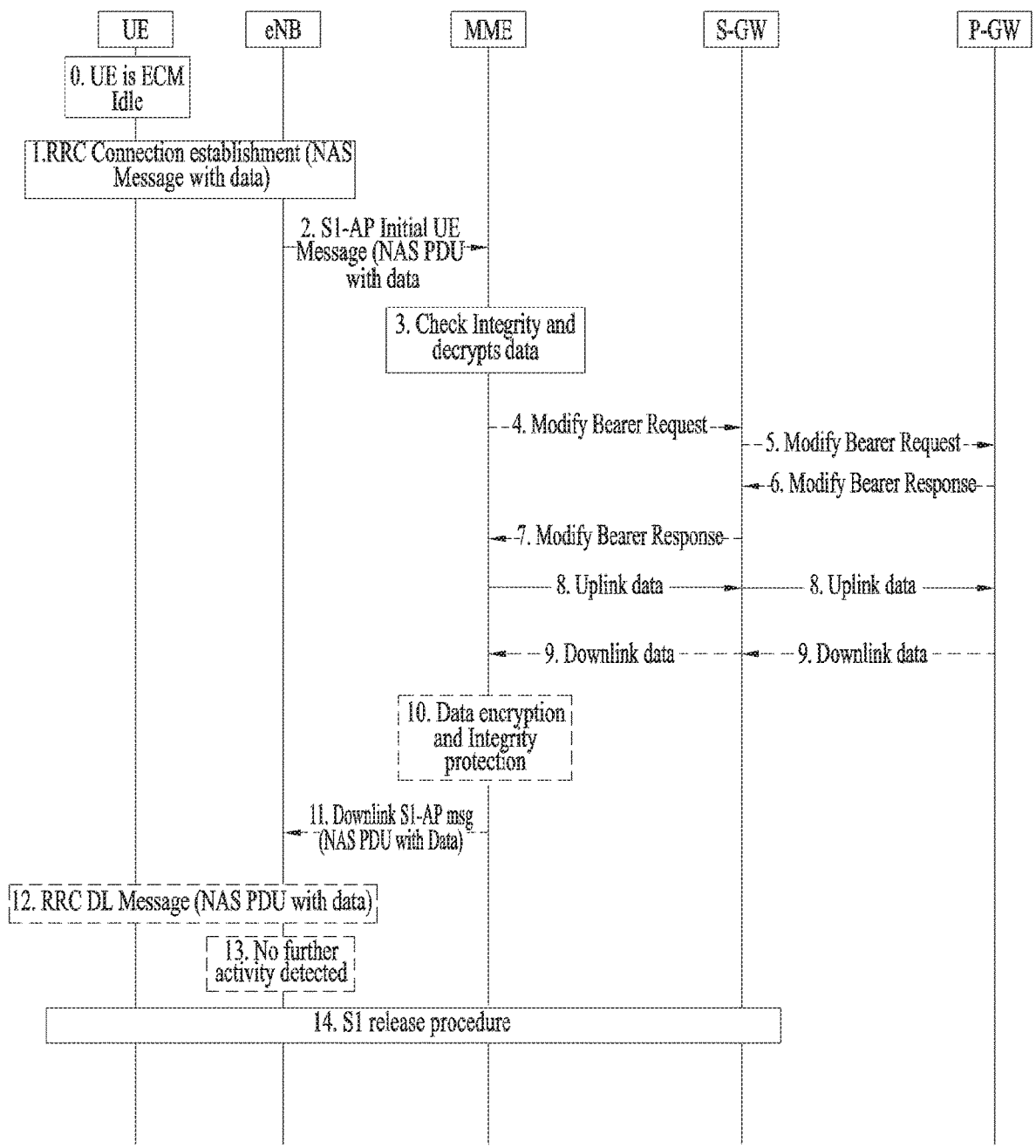
FIG. 10 is a diagram illustrating an entire data transfer procedure in the EPS system when the Control Plane CIoT EPS optimization is used.

FIG. 10 is a diagram illustrating an entire data transfer procedure in the EPS system when the Control Plane CIoT EPS optimization is used. Specifically, FIG. 10 shows a mobile originated data transfer procedure in the Control Plane CIoT EPS optimization in detail.

0. The UE is ECM-IDLE.
1. The UE establishes a RRC connection and sends as part of it Uplink Data encrypted and integrity protected in a NAS message. The UE can also indicate a Release Assistance Information in the NAS message about whether Downlink data transmission (e.g.

Acknowledgements or responses to UL data) subsequent to the Uplink Data transmission is expected or not. The UE may also indicate whether the S1 connection has to be released when DL data is received.

2. The NAS message sent in step 1 is relayed to the MME by the eNB using a S1-AP Initial UE message.
3. The MME checks the integrity of the incoming NAS message PDU and decrypts the data it contains. The MME also decides at this stage whether the data transfer will use the SGi or SCEF-based delivery.
4. If the S11-U connection is not established, the MME sends a Modify Bearer Request message (MME address, MME TEID DL, Delay Downlink Packet Notification Request, RAT Type) to the S-GW. The S-GW is now able to transmit downlink data towards the UE. If the P-GW requested UE's location and/or User CSG information and the UE's location and/or User CSG information has changed, the MME shall send the Modify Bearer Request message and also include the User Location Information IE and/or User CSG Information IE in this message. If the Serving Network IE has changed compared to the last reported Serving Network IE then the MME shall send the Modify Bearer Request message and also include the Serving Network IE in this message. If the UE Time Zone has changed compared to the last reported UE Time Zone then the MME shall send the Modify Bearer Request message and include the UE Time Zone IE in this message.
5. If the RAT Type has changed compared to the last reported RAT Type or if the UE's Location and/or Info IEs and/or UE Time Zone and Serving Network id are present in step 4, the S-GW shall send the Modify Bearer Request message (RAT Type) to the P-GW. User Location Information IE and/or User CSG Information IE and/or Serving Network IE and/or UE Time Zone are also included if they are present in step 4.

If the Modify Bearer Request message is not sent because of above reasons and the P-GW charging is paused, then the S-GW shall send a Modify Bearer Request message with PDN Charging Pause Stop Indication to inform the P-GW that the charging is no longer paused. Other IEs are not included in this message.

6. The P-GW sends the Modify Bearer Response to the S-GW.
7. If a Modify Bearer Request message was sent at step 4 the S-GW shall return a Modify Bearer Response (S-GW address and TEID for uplink traffic) to the MME as a response to a Modify Bearer Request message.
8. The MME sends Uplink data to the P-GW via the S-GW.
9. If no Downlink Data are expected based on the Release Assistance Information from the UE in step 1, the MME immediately releases the connection and therefore step 14 is executed. Otherwise, Downlink data may arrive at the P-GW and the P-GW sends them to the MME via the S-GW. If no data is received steps 11-13 are skipped. While the RRC connection is active, the UE may still send Uplink data in NAS PDUs that are carried in a S1AP Uplink message (not shown in FIG. 10). At any time the UE may provide Release Assistance Information with the Uplink data.
10. If Downlink data are received in step 9, the MME encrypts and integrity protects the Downlink data.
11. If step 10 is executed then Downlink data are encapsulated in a NAS PDU and sent to the eNB in a S1-AP Downlink Message. If the Release Assistance Information was received with Uplink data and it indicated a request to release the RRC connection upon Downlink data reception, the MME also includes in the S1-AP message an indication that the eNB shall release the RRC connection after successfully sending data to the UE.

The eNB sends a RRC Downlink data including the Downlink data encapsulated in NAS PDU. This may include a request to immediately release the RRC connection if in step 11 the S1-AP message included in the Release Assistance Information a request to tear down the RRC connection if Downlink data are received. If so step 14 is immediately executed.

13. If no NAS activity exists for a while, the eNB starts an S1 release in step 14.
14. The S1 release procedure is performed as described in section 5.3.5 of 3GPP TS 23.401.

Figure 11:
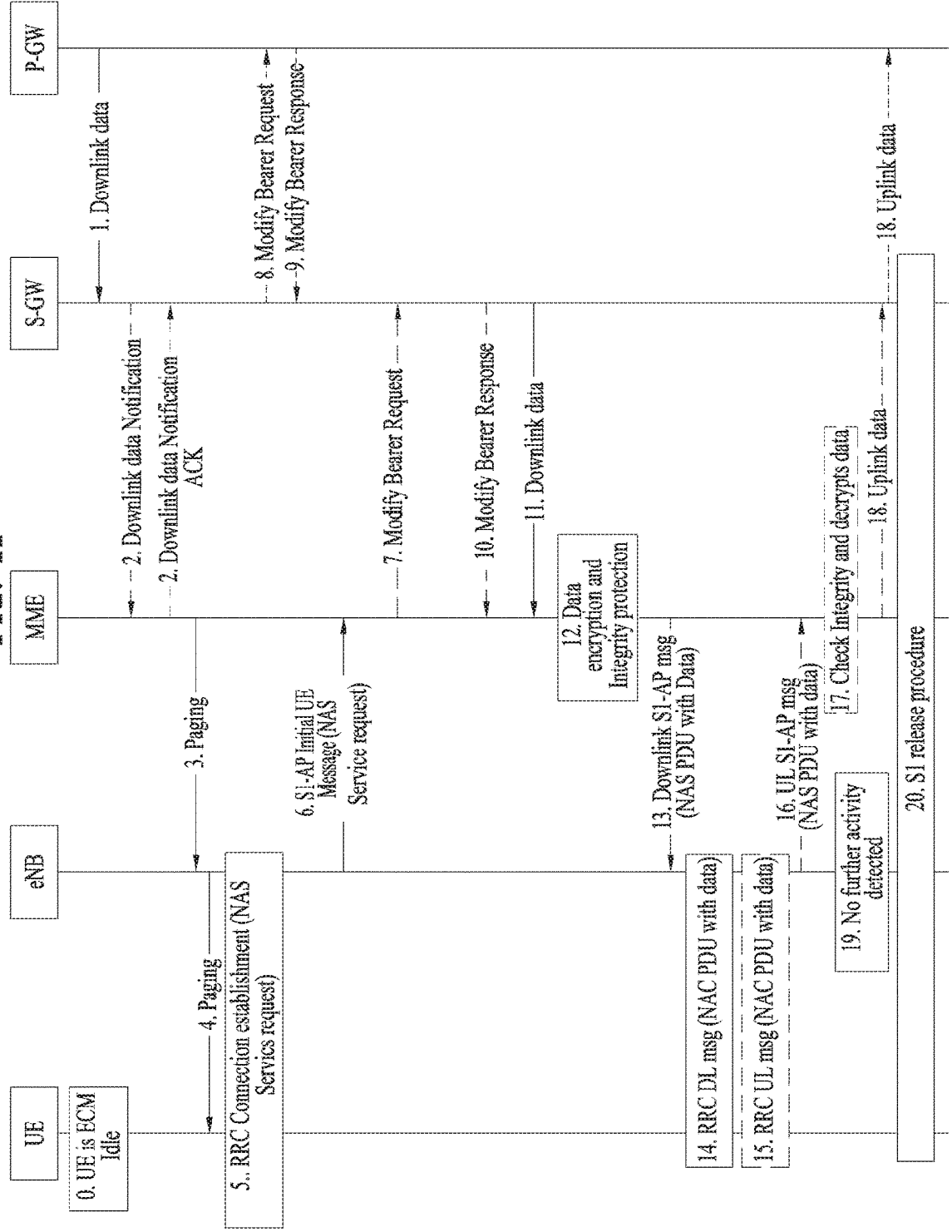
FIG. 11 illustrates mobile terminated data transfer in the EPS system in accordance with the Control Plane CIoT EPS optimization.

FIG. 11 illustrates mobile terminated data transfer in the Control Plane CIoT EPS optimization.

0. The UE is EPS attached and in ECM-Idle mode.
1. When the S-GW receives a downlink data packet/control signalling for a UE, if the S-GW context data indicates no downlink user plane TEID towards the MME, it buffers the downlink data packet and identifies which MME is serving that UE.
2. If the S-GW is buffering data in step 1, the S-GW sends a Downlink Data Notification message (ARP, EPS Bearer ID) to the MME for which it has control plane connectivity for the given UE. The ARP and EPS Bearer ID are always set in Downlink Data Notification. The MME responds to the S GW with a Downlink Data Notification Ack message.
3. If the UE is registered in the MME and considered reachable, the MME sends a Paging message (NAS ID for paging, TAI(s), UE identity based DRX index, Paging DRX length, list of CSG IDs for paging, Paging Priority indication) to each eNB belonging to the tracking area(s) in which the UE is registered.

4. If eNBs receive paging messages from the MME, the UE is paged by the eNBs.

5~6. As the UE is in the ECM-IDLE state, upon reception of paging indication, the UE sends a UE triggered Service Request NAS message over RRC Connection request and S1-AP initial message. The Service Request NAS message, when C-IoT Control Plane optimisation applies, does not trigger Data radio bearer establishment by the MME and the MME can immediately send Downlink Data it receives using a NAS PDU to the eNB.

7. If the S11-U is not established, the MME sends a Modify Bearer Request message (MME address, MME TEID DL, Delay Downlink Packet Notification Request, RAT Type) to the S-GW. The S-GW is now able to transmit downlink data towards the UE. The usage of the Delay Downlink Packet Notification Request Information Element is described in section 5.3.4.2 of 3GPP TS 23.401, and it can be equally applied to this case. Moreover, it is applied regardless of whether the S11-U is established or not.

NOTE: If the currently used RAT is NB-IoT, it is reported as an RAT different from E-UTRA.

8. If the RAT Type has changed compared to the last reported RAT Type or if the UE's Location and/or Info IEs and/or UE Time Zone and Serving Network id are present in step 7, the S-GW shall send the Modify Bearer Request message (RAT Type) to the P-GW. User Location Information IE and/or User CSG Information IE and/or Serving Network IE and/or UE Time Zone are also included if they are present in step 7. Other IEs are not included in this message.

9. The P-GW sends the Modify Bearer Response to the S-GW.

10. If a Modify Bearer Request message was sent at step 7, the S-GW shall return a Modify Bearer Response (S-GW address and TEID for uplink traffic) to the MME as a response to a Modify Bearer Request message.

11. Buffered (if S11-U was not established) Downlink data is sent by the S-GW to the MME.

12~13. The MME encrypts and integrity protects Downlink data and sends it to the eNB using a NAS PDU carried by a Downlink S1-AP message.

14. The NAS PDU with data is delivered to the UE via a Downlink RRC message. This is taken by the UE as implicit acknowledgment of the Service request message sent in step 5.

15. While the RRC connection is still up, further Uplink and Downlink data can be sent using NAS PDUs. In step 16 an Uplink data transfer is shown using an Uplink RRC message encapsulating a NAS PDU with data. At any time the UE may provide a Release Assistance Information with Uplink data in the NAS PDU.

16. The NAS PDU with data is send to the MME in an Uplink S1-AP message.

17. The data is checked for integrity and decrypted.

18. The MME sends UL data to the P-GW through the S-GW and executes action related to the presence of Release Assistance Information after behavior for mobile originated (MO) transfer.

19. If no NAS activity exists for a while the eNB detects inactivity and executes step 20.

20. The eNB starts eNB initiated S1 release procedure as described in section 5.3.5 of 3GPP TS 23.401.

Figure 12:
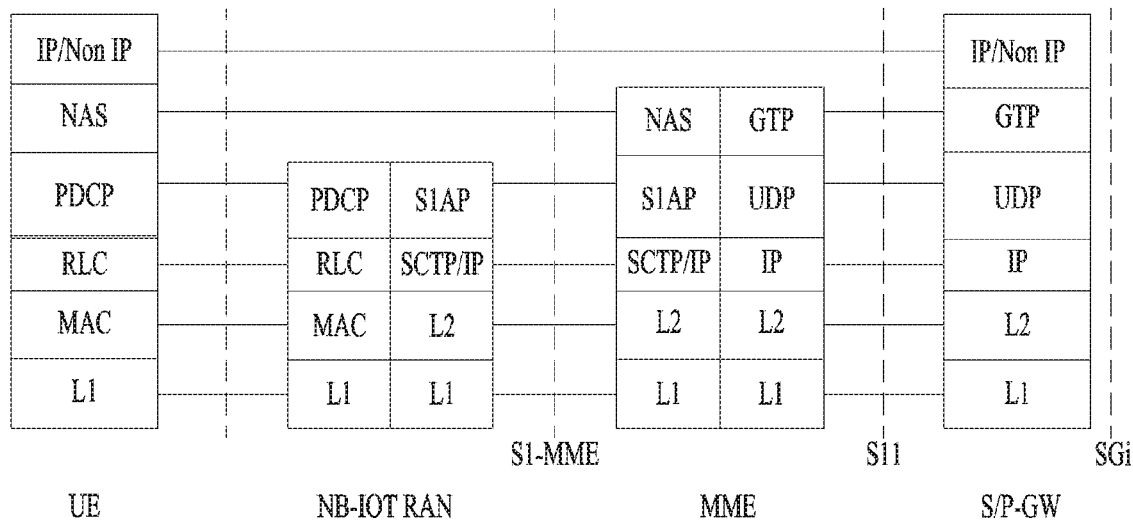
FIG. 12 illustrates user plane protocol stacks between a UE and a P-GW in accordance with the Control Plane CIoT EPS optimization.

FIG. 12 illustrates user plane protocol stacks between a UE and a P-GW in accordance with the Control Plane CIoT EPS optimization.

In FIG. 12, GTP-u is a protocol which tunnels user data between MME and the S GW as well as between the S GW and the P GW in the backbone network. GTP encapsulates all end user packets. UDP/IP are the backbone network protocols used for routing user data and control signalling. NAS is the Non Access Stratum Layer used to carry Data between UE and MME and may include Header compression and security functions of user plane IP data.

When IP protocols are used, each IP packet includes a header with 20 bytes or more. However, most IoT UEs transmit and receive small size packets. In other words, whenever each IoT UE transmits or receives an IP packet, 20-byte overhead occurs. In most cases, in particular, in the case of the IoT UE, that is, when a UE is configured to process one specific service, packets processed by the UE use a specific server and protocol. That is, the headers of IP packets transmitted or received by the UE are generally configured to have the same value. In this case, if the same IP header information is transmitted whenever IP packets are transmitted, it may be wasteful. In particular, considering that radio resources are limited, the unnecessarily included header information becomes problematic in that power consumption of the UE increases as transmission/reception time of the UE increases.

To solve this problem, header compression protocols are used. The robust header compression (RoHC) is one of the well-known header compression protocols defined by the Internet Engineering Task Force (IETF). Hereinafter, a description will be given of general operation in accordance with the header compression protocol. When communication is initiated, a transmitting side transmits an IP packet containing an IP header to a receiving side. In this case, an identifier capable of identifying the IP header is transmitted together. Based on the identifier, the receiving side extracts IP header information included in the IP packet and then stores the extracted IP header information in its memory. Thereafter, when transmitting a new IP packet, the transmitting side examines whether header information of the new IP packet is equal to the IP header information managed by the transmitting and receiving sides. If the header information of the new IP packet is equal to the IP header information, the transmitting side transmits the identifier capable of identifying the IP header (e.g., a context information indicator). After eliminating the IP header, the transmitting side transmits the new IP packet. In addition, using the identifier capable of identifying the IP header, the receiving side restores the IP header from the IP packet received from the transmitting side.

In the above-described CIoT optimization procedure, the header compression protocol is used in the NAS layer unlike the prior art where the header compression is performed by the PDCP layer. This is because of the introduction of the Control Plane CIoT optimization scheme. That is, according to the CIoT optimization, when the NAS layer transmits a Service Request message, an IP packet is included in the Service Request message in order to reduce signaling between a UE and network node during the data transfer procedure. Therefore, in the Control Plane CIoT optimization, the number of RRC messages exchanged between the UE and eNB can be reduced because the IP packet is delivered during the service request procedure. However, as described above, considering that an IP packet generated for specific IoT is configured to be exchanged with a specific server, the header compression protocol needs to be applied to such an IP packet, and thus the header compression program is managed by the NAS layer. In particular, in the case of a message transmitted from the NAS layer to the RRC layer, since an IP packet generated by a service application is included in the NAS message instead of applying the IP packet format, the RRC or PDCP layer cannot use the header compression program because the layer cannot access or read the IP packet in the NAS massage.

However, when the header compression is performed by the NAS layer, a header compression related context between the network and UE is highly likely to be out of synchronization. For example, in the prior art, since the UE deletes context information used in the header compression protocol whenever the RRC connection is disconnected and generates new context information related to the header compression program with the eNB whenever the RRC connection is established, the context information between the eNB and UE may rarely be out of synchronization. On the other hand, in the CIoT, even when the UE disconnects the RRC connection, the network and UE do not delete the context information used in the NAS layer. That is, they stores the context information in their own memories or storage units and reuse it when the RRC connection is re-established. However, in the case of the IoT UE, since an IP packet is generated once every few hours, the stored context information is highly likely to be erroneous. For example, in the case of the UE, the context information may be deleted while the operating system (OS) of the smartphone manages the memory. In the case of the network, the context information may be deleted when one of network equipments is reset or when a buffer overflows. In addition, considering that a security process is performed by the NAS layer, a failure in the security process may cause the context information to be out of synchronization.

When the context information is out of synchronization, if the receiving side attempts to restore the IP packet, which was compressed and sent by the transmitting side, the receiving side cannot obtain the original IP packet. Therefore, in this case, there occurs a problem that IoT services are not correctly provided.

Until now, as a response to the NAS messages related to service request, tracking area update request, and the like, rejection or acceptance of the NAS message (e.g., service rejection/acceptance, tracking area update rejection/acceptance) has existed, and any response to data carried by the NAS message was not present. In other words, when there is a rejection response to the NAS message, the rejection response cannot indicate how data carried by the NAS message is processed.

Therefore, the present invention proposes not only a method for rapidly determining whether context synchronization between a network and UE is broken to avoid additional data loss when the network and UE reuse a context used in the previous data transfer instead of creating a new context related to the header compression protocol whenever the network and UE establish a new RRC connection but also a method for rapidly matching the context synchronization.

In addition, the present invention proposes that an entity performing the header compression protocol performs decompression of a received packet and if an error occurs during the decompression process, the entity informs a transmitting side that transmits the packet of the occurrence of the error. Hereinafter, a header compression protocol entity that performs decompression of received data packets is referred to as a receiving side HC entity, and a header compression protocol entity that performs compression of a data packet is referred to as a transmitting side HC entity.

While performing the decompression, the entity performing the header compression protocol may consider that there is an error in the following cases.

When detecting an erroneous header value in the received data packet, the receiving side HC entity may consider that there is an error. For example, the receiving side HC entity checks a context information indicator indicated by the received data packet. If the received data packet does not contain context information corresponding to the context information indicator, the receiving side HC entity may consider that there is an error. In other words, for example, when the compressed data packet is received together with context information indicator 1, if there is no context information indicator 1 in the context information managed by the receiving side HC entity, the receiving side HC entity may consider that an error occurs.

When the receiving side HC entity has not received information capable of generating contexts, for example, a full packet, i.e., a full header packet, etc., if the received data packet indicates that it is a compressed packet, the receiving side HC entity may consider that there is an error. For example, the receiving side HC entity attempts to decompress the received data packet and then calculates a header sum using the decompressed data packet. If the calculated header sum is different from a header sum included in the data packet, the receiving side HC entity may consider that there is an error.

The receiving side HC entity attempts to decompress the received data packet and additionally performs deciphering (de-ciphering) of the decompressed data packet. When detecting an erroneous header value in the deciphered data packet, the receiving side HC entity may consider that there is an error.

The receiving side HC entity may additionally perform deciphering using the decompressed data packet. If an error occurs in the corresponding packet during such a deciphering process, the receiving side HC entity or an entity managing or including the receiving side HC entity may consider that the error occurs. The occurrence of the error during the deciphering process may mean that the error occurs in the header of the data packet generated after deciphering or the corresponding data packet is deleted by the error.

When the receiving side HC entity detects an error during the decompression process, the receiving side HC entity informs the transmitting side HC entity that the error has occurred. To inform the transmitting HC entity that the error has occurred, the receiving side HC entity can use the following methods.

Dedicated NAS Message

To inform the transmitting side HC entity of the fact that the error has occurred, the receiving side HC entity can define a new type of message. That is, the NAS message dedicated to error indication may be defined. For example, one value may be additionally designated for the new type of message. In addition, the message transmitted such that its message type is set using the additionally designated value may be used for the purpose of indicating an error occurring at the compression protocol entity. This message may be defined as a Header Compression Error Indication message or a message with the similar meaning. Through the dedicated message, the receiving side HC entity may inform the transmitting side HC entity that a problem has occurred in the decompression process, and upon receiving the message, the transmitting side HC entity may recognize that the problem has occurred at the peer HC entity during the decompression process. Alternatively, a Downlink General NAS Transport message or Uplink General NAS Transport message may be used to inform that an error has occurred during the decompression process. Moreover, a header compression error indication container may be additionally designated in a generic message container type included in the Downlink/Uplink General NAS Transport message. Through the header compression error indication container, the transmitting side HC entity and receiving side HC entity may recognize and inform that an error has occurred.

New Error Cause Field Value or Status

For example, an EMM Cause field in the NAS message can be used. The value capable of indicating a header compression error can be additionally configured as the value capable of being set in the EMM Cause field. The receiving side HC entity can inform the transmitting side HC entity that a problem has occurred during the decompression process by setting the value capable of indicating the header compression error within the EMM Cause field in the NAS message. Upon receiving the NAS message, the transmitting side HC entity may recognize that the problem has occurred at the peer HC entity during the decompression process. That is, when detecting a compression error, the receiving side HC entity may set a header compression error value in the EMM Cause field or filed corresponding thereto and then transmit it to the transmitting side HC entity.

The receiving side HC entity may create an IP packet with no payload and transmit, to the peer HC entity, that is, the transmitting side HC entity, information for requesting to transmit the full header packet, i.e., the packet that allows the receiving side HC entity to reconfigure the context information. Such a data packet used by the receiving side HC entity to request the transmitting side HC entity to transmit a full header packet may be transmitted through the NAS message to the transmitting HC entity.

Although it is described that the above information or messages are transmitted from the header compression entity, since the header compression entity belongs to the NAS protocol entity or connected thereto, the NAS protocol entity may transmit the information or messages or configure transmission and reception thereof.

Alternatively, when an error occurs during the decompression process, the connection and communication may be reconfigured at the beginning. In this case, if a UE first detects the compression error, the UE may request RRC connection release. Alternatively, the UE may inform that a problem has occurred at the header compression entity and then request an RRC reconnection.

When receiving the information or message, the header compression protocol entity operates as intended by the information or message.

When detecting that an error has occurred at the header compression protocol entity or informed from the peer that the error has occurred, the NAS layer managing or including the header compression protocol, or MME, UE may start a procedure for disconnecting the connection established therebetween. In this case, if the network first detects the compression error or is informed of the compression error from a UE, the network may request the UE to re-establish a connection by transmitting messages such as Service Request Reject, Attach Reject, PDN connection release (disconnection), etc. The network may inform the UE that the error has occurred in the header compression protocol or that reconnection is required through EMM cause, error code, etc. Alternatively, when detecting the compression error or informed of the compression error from the network, the UE sends a request for releasing the connection to the network. During this process, the UE may additionally inform the network that the error has occurred in the header compression protocol.

Meanwhile, the present invention proposes to use the following methods for efficient use of the header compression protocol when a network and UE use the header compression protocol in the NAS level, in particular, when a certain NAS message is implemented to include user data.

It is proposed that when a user data packet is included in the NAS message and then transmitted, a transmitting side that configures and transmits the NAS message includes, in the NAS message, information indicating whether the user data packet included in the NAS message is compressed or not. For example, when the transmitting side includes a non-compressed user data packet in the NAS message, the transmitting side may include, in the header of the NAS message, information indicating that the user data packet included in the NAS message has not been compressed. When receiving the NAS message from the peer, a receiving side may not decompress the data packet included in the NAS message if the header of the NAS message indicates that the data packet has not been compressed. On the other hand, when the transmitting side includes a compressed user data packet in the NAS message, the transmitting side may include, in the header of the NAS message, information indicating that the user data packet included in the NAS message has been compressed. When receiving the NAS message from the peer, the receiving side may decompress the data packet included in the NAS message if the header of the NAS message indicates that the data packet has been compressed.

It is proposed that when a user data packet is included in the NAS message and then transmitted, a transmitting side that configures and transmits the NAS message includes, in the NAS message, information indicating whether the user data packet included in the NAS message can generate a context, for example, information on whether the user data packet is a full (header) packet or not. In other words, information capable of determining whether a receiving side can generate the context can be provided to the receiving side. For example, when the transmitting side includes the full packet that allows the receiving side to generate the context in the NAS message, the transmitting side may include, in the header of the NAS message, information indicating that the user data packet included in the NAS message is the full packet. Upon receiving the NAS message from the peer, if the header of the received NAS message indicates that the data packet included in the NAS message is the full packet, the receiving side may perform a process for generating or updating the context in the header compression protocol using the data packet. When the transmitting side does not include the full packet that allows the receiving side to generate the context in the NAS message, that is, when the transmitting side includes an extra compressed packet rather than the full packet in the NAS message, the transmitting side may include, in the header of the NAS message, information indicating that the user data packet included in the NAS message is not the full packet, for example, information indicating that the user data packet is the extra compressed packet. Upon receiving the NAS message from the peer, if the header of the received NAS message indicates that the data packet included in the NAS message is the extra packet rather than the full packet, the receiving side may decompress the received packet using the previously generated context information. When an error occurs in the header compression protocol, when no data packet is received after generation of the header compression protocol, or when the previously generated context is no longer valid, the receiving side may not process the received compressed packet (i.e., the packet which is not the full packet) until receiving the full packet, delete the received compressed packet, or defer processing thereof until receiving the full packet.

The NAS message may include information indicating whether the NAS message contains a user data packet or not. For example, when the user data packet is not included in the NAS message, the header of the NAS message may include an indicator indicating that the user data packet is not included in the NAS message. When the user data packet is included in the NAS message, the header of the NAS message may include an indicator indicating that the user data packet is included in the NAS message. By doing so, the receiving side can determine whether to examine an additional indicator indicating whether the compression is performed.

That is, the following information may be included in the header of the NAS message:
  Whether user data is included in the NAS message;
  Whether the user data included in the NAS message is a compressed packet;
  Whether the user data included in the NAS message is a packet configured in the header compression protocol;
  Whether the user data included in the NAS message is a full packet configured in the header compression protocol; and/or
  Whether ciphering is applied to the user data included in the NAS message.

In the above process, a message capable of containing a data packet, for example, an Attach Request message, a Service Request message, a Downlink Generic NAS Transport message, or an Uplink Generic NAS Transport message can be used as the NAS message.

In some cases, for example, when a certain IoT UE has an extremely long message generation period, the context for the header compression algorithm may be unsynchronized between transmitting and receiving sides. In this case, it may be advantageous of not using the header compression algorithm. Therefore, the present invention proposes that when a UE and network establish a connection therebetween or creates a bearer, the UE and network negotiate or inform whether the header compression protocol will be used. For example, when the UE desires not to use the header compression protocol, the UE includes an indicator indicating whether the UE prefers to use the header compression protocol in a Service Request message, an Attach Request message, or another NAS message by setting the indicator as 'DISABLED' and then transmits it to the network. On the contrary, when the UE desires to use the header compression protocol, the UE includes the indicator indicating whether the UE prefers to use the header compression protocol in the Service Request message, the Attach Request message, or another NAS message by setting the indicator as 'ENABLED' and then transmits it to the network.

Upon receiving the indicator indicating whether the UE prefers to use the header compression protocol, the network determines whether to use the header compression protocol based on the UE's preference and its configuration and then inform the UE whether the header compression protocol will be used. For example, the network informs whether the header compression protocol will be used through a Service Accept message, an Attach Accept message, etc. Upon receiving information on whether the header compression protocol will be used, which is determined by the network, the UE uses the compression header protocol only when the network indicates use of the header compression protocol. In this process, the network may inform the UE of whether the header compression protocol will be used, regardless of whether the UE desires to use the header compression protocol or whether the relevant indicator is transmitted. In addition, only when the network indicates use of the header compression protocol, the UE can use the header compression protocol and perform the relevant operations according to the present invention.

Alternatively, when the Service Accept message, the Attach Accept message, or another NAS message transmitted from the network indicate that the network instructs not to use the header compression protocol, the UE may not use the header compression protocol. For example, only when use of the header compression protocol is explicitly indicated by the Service Accept message, the Attach Accept message, or another NAS message transmitted from the network, the UE uses the header compression protocol.

However, in the case of IoT UEs, low-cost simple processors are used and battery efficiency is also important. Thus, in some cases, supporting no header compression protocol can be more advantageous in terms of reducing the development cost of the IoT UE. That is, an IoT UE may support the header compression protocol, whereas another IoT UE may not support the header compression protocol. In this case, the IoT UE may inform the network whether it supports the header compression protocol. By doing so, the network may efficiently configure the header compression only for UEs that support the header compression protocol or apply the methods proposed in the present invention.

According to the above-described proposals of the present invention, when the receiving side HC entity detects an error during the decompression process, the receiving side HC entity can inform the transmitting side HC entity that the error has occurred. While performing this process, the receiving side HC entity can also inform the transmitting side HC entity of the following information.

The UE includes a user data packet in the Service Request message or another NAS message and transmits it to the network. However, after receiving the service request including the user data packet, the network may reject the service request from the UE due to some problems. For example, although the UE transmits the Service Request message to the network, the network may transmit, to the UE, a Service Reject message in response to the message. Assuming that a full packet was configured in the header compression protocol and this was included in the NAS message and transmitted from the UE to the network, the rejection of the NAS message may imply that the network could delete the full packet without processing thereof. In this case, since the UE transmits the full packet to the network, the UE could expect that the network has a context suitable for the header compression protocol. However, since the network does not have the context suitable for the header compression protocol, the network does not process the NAS message including the full packet. Thereafter, if the UE transmits a compressed packet to the network using its context, regarding a new data packet generated by a user, the network will delete the compressed packet because an error occurs.

Therefore, the present invention proposes that when a UE receives the NAS message indicating rejection or error from the network after transmitting the Service Request message, Attach Request message, Tracking Area Update Request message, or another NAS message including user data, the UE performs at least one of the following operations.

- The UE may instruct its header compression protocol entity to use a full packet in transmitting next user data. In this case, when transmitting the next user data, the header compression protocol may configure and transmit the full packet or packet that allows the receiving side to create a context.
- The UE may inform its header compression protocol entity that the previously transmitted data was not correctly transmitted to the network. In this case, when transmitting the next user data, the header compression protocol may configure and transmit the full packet or packet that allows the receiving side to create a context.
- The UE may manage a variable named as next_send_full_ packet or a variable with the similar meaning and set this variable to 'YES'. The following operation can be performed according to the variable.
  - The UE receives a new user packet from a higher layer.
    - The UE examines the value of variable next_send_full_packet.
      - If the value is 'YES', the UE configures and transmits the full packet.
      - If the value is 'NO', the UE configures another packet rather than the full packet, e.g., a compressed packet and then transmits it.

However, depending on the network implementation, a certain network may process a user data packet received in the NAS message such as the Service Request message, Attach Request message, etc. although it transmits the Service Reject message or Attach Reject message to the UE. In this case, when transmitting the NAS message to the UE, the network may inform whether the user packet included in the NAS message, which was previously transmitted from the UE, will be processed. For example, when transmitting the Service Reject message to the UE, the network may transmit an indicator named as user_packet_processed or an indicator with the similar meaning at the same time.

- If the network already processes the user packet previously transmitted from the UE or uses the user packet in the header compression protocol, the network sets indicator user_packet_processed to 'YES' and transmits it.
- If the network does not process the user packet previously transmitted from the UE, the network sets indicator user_packet_processed to 'NO' and transmits it.
  - Upon receiving this information, if the previously transmitted packet is the full packet or information required for the header compression protocol to generate the context, the UE configures and transmits the full packet or information required for the header compression protocol to generate the context in transmitting the next user packet.

The above operation may be performed through association with RRC connection management. For example, while the RRC connection is performed, the NAS message is included in an RRC Connection Setup Complete message and then transmitted. However, after transmission of the RRC Connection Setup Complete message, the RRC connection may be disconnected. In this case, the RRC layer informs a NAS entity that the RRC connection has been disconnected. Upon receiving information indicating that the RRC connection has been disconnected, if the previously transmitted NAS message contains user data, the NAS entity may configure and transmit the full packet or information required for the header compression protocol to generate the context in transmitting a new user packet in the next time.

Similarly, when the UE transmits an Uplink Information Transfer message corresponding to the RRC message, the NAS message included in the Uplink Information Transfer message contains a user packet, the RRC connection is suddenly disconnected or an error occurs therein after the transmission of the Uplink Information Transfer message, the RRC layer may inform the NAS entity of relevant information. Upon receiving this information, if user data is included in the previously transmitted NAS message, the NAS entity may configure and transmit the full packet or information required for the header compression protocol to generate the context in transmitting a new user packet in the next time.

When the NAS entity requests an RRC entity for NAS message transmission, the NAS entity may inform whether user data has been included in the NAS message. In addition, when an error has occurred in the RRC connection and when the user data has been included in the message previously transmitted from the NAS, the RRC entity transmits to the NAS layer a message indicating an RRC connection error or failure in transmission the NAS message including the user data. Upon receiving such information, if the user data is included in the previously transmitted NAS message, the NAS entity may configure and transmit the full packet or information required for the header compression protocol to generate the context in transmitting a new user packet in the next time.

Regarding the above-described procedure(s) of the present invention, the header compression protocol is located at an MME in the network.

In the above-described procedure(s) of the present invention, one entity may include the receiving side HC entity and transmitting side HC entity. For example, the UE may have receiving side HC entity 1 and transmitting side HC entity 1, and the network may have receiving side HC entity 2 and transmitting side HC entity 2. In this case, a compressed packet transmitted from transmitting side HC entity 1 is received by receiving side HC entity 2, and a compressed packet transmitted from transmitting side HC entity 2 is received by receiving side HC entity 1. For efficient operation, the receiving side HC entity and transmitting side HC entity, which are located at the same HC entity may be implemented as one entity, or the receiving side HC entity and transmitting side HC entity may be configured to exchange information with each other. For example, when receiving side HC entity 1 intends to transmit feedback to transmitting side HC entity 2, receiving side HC entity 1 may request transmitting HC entity 1 to transmit the feedback. The feedback transmitted from transmitting side HC entity 1 is received by transmitting side HC entity 2 and then used for the next operation. If necessary, the feedback may be transmitted to receiving side HC entity 2.

The user data (ESM message) is not contained in messages used in the conventional service request (EMM) process. However, in the CIoT optimization, the user data can be carried by the message used in the EMM process. According to the present invention, in order to allow the UE to know how the user data is processed, when the network sends the Service Reject message in response to the Service Request message corresponding to the EMM message, the network includes information on a processing state of the user data in the Service Reject message. This will be explained from the perspective of ESM and EMM entities with reference to FIGS. 13 and 14.

Figure 13:
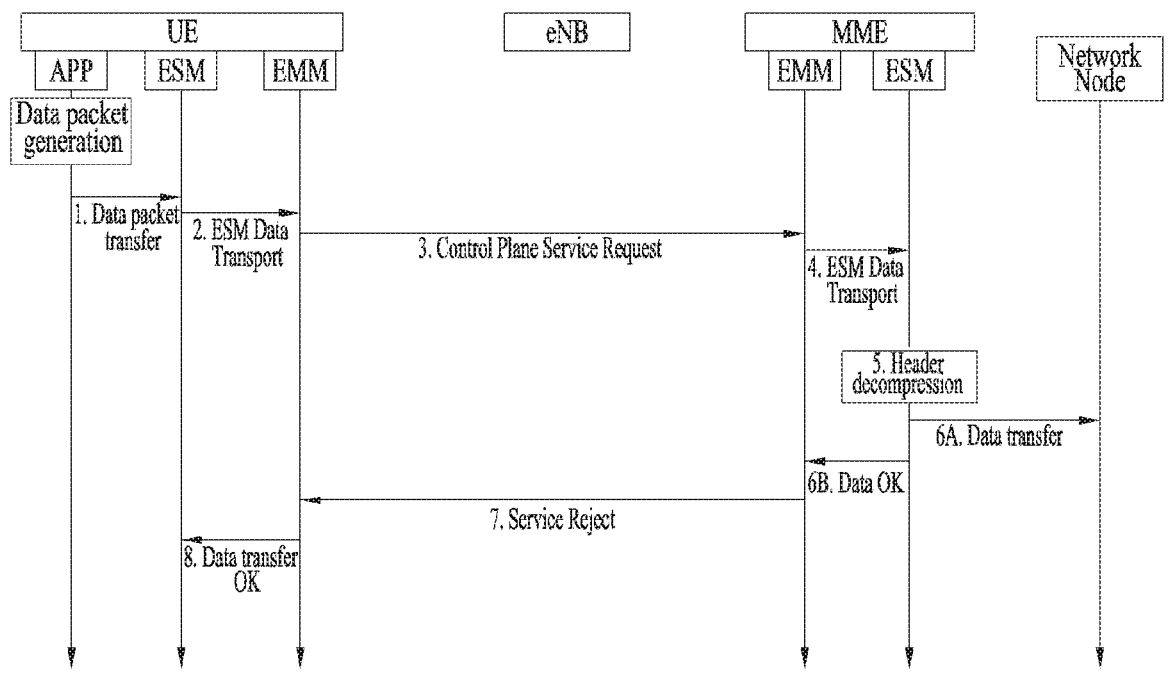
FIGS. 13 and 14 illustrate examples of user data transfer in the Control Plane CIoT EPS optimization according to the present invention.

FIG. 13 illustrates an example of user data transfer in the Control Plane CIoT optimization. In particular, FIG. 13 shows an example of user data transfer according to the above-described proposal of the present invention.

1. User data is generated at an application layer (or entity) of a UE. If the UE is configured to transfer data through a control plane, that is, if the UE is configured to transmit data through a control plane according to the Control Plane CIoT optimization, the user data is transferred to an ESM entity.
2. The ESM entity of the UE includes the user data in an ESM Data Transport message and then transmits it. If the ESM entity is configured to use header compression, the UE performs the header compression on the user data and then includes it in the ESM Data Transport message. The ESM entity sends the ESM Data Transport message to an EMM of the UE. The UE and an MME can determine whether to use the header compression at their ESM entities through negotiation.
3. To establish an EMM connection, the EMM entity of the UE configures Control Plane Service Request, includes the ESM Data Transport message in Control Plane Service Request, and then transmits it.
4. The MME processes the received Control Plane Service Request message. If the internal capacity of the MME is insufficient, the MME may determine to reject Control Plane Service Request from the UE. However, if the Control Plane Service Request message contains the ESM Data Transport message, the MME forwards the ESM Data Transport message to its ESM entity.
5. The ESM entity of the MME processes the received ESM Data Transport message. When use of the header compression is configured, the ESM entity of the MME applies header decompression to the user data included in the ESM Data Transport message. The UE and MME can determine whether to use header compression at the ESM entities through negotiation.
6A. If the header decompression is successfully processed, the user data is transferred to another network node.
6B. The ESM entity of the MME informs the EMM entity of the MME that the header decompression has been successfully performed.
7. The EMM entity of the MME includes information indicating that the header decompression or data transfer has been successfully performed in a Service Reject message and then transmits the information to the UE as the result of steps 4 and 6B.
8. Upon receiving the Service Reject message, the UE checks the information indicating that the header decompression or data transfer has been successfully performed from the Service Reject message. Thus, the UE makes no additional attempt to transfer the user data that the UE has desired to transmit. When the Service Reject message does not contain the information indicating that the header decompression or data transfer has been successfully performed, the UE attempts to retransmit the user data.

Figure 14:
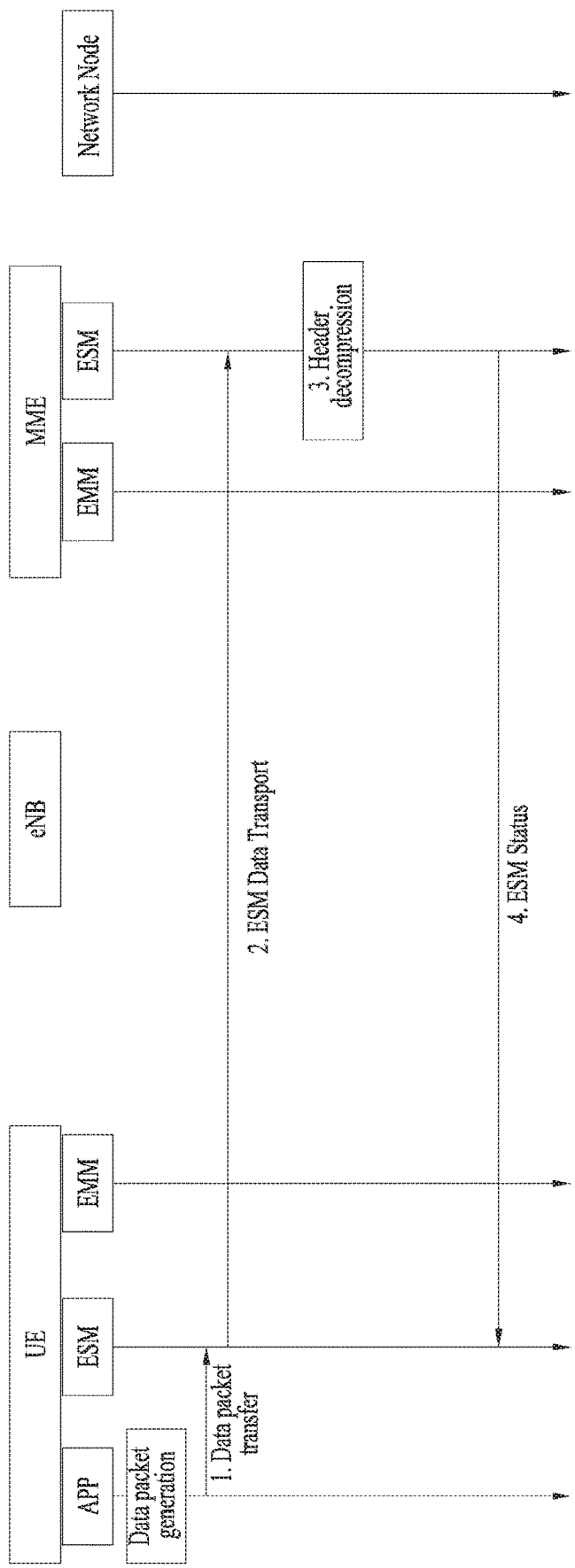

FIG. 14 is another example of user data transfer in the Control Plane CIoT optimization. In particular, FIG. 14 shows another example of user data transfer according to the above-described proposal of the present invention.

1. User data is generated at an application layer (or entity) of a UE. If the UE is configured to transfer data through a control plane, the user data is transferred to an ESM entity.
2. The ESM entity includes the user data in an ESM Data Transport message and then transmits it. If the ESM entity is configured to use header compression, the UE performs the header compression on the user data and then includes it in the ESM Data Transport message. The ESM entity sends the ESM Data Transport message to an MME
3. An ESM entity of the MME processes the received ESM Data Transport message. If the ESM entity is configured to use the header compression, the ESM entity of the MME applies header decompression to the user data included in the ESM Data Transport message.
4. If the ESM entity of the MME fails to perform the header decompression in step 3, the ESM entity sends an ESM Status message to the ESM of the UE. The ESM Status message carries information indicating that the header decompression or data transfer has not been successfully performed.

When the ESM Status message includes the information indicating that the header decompression or data transfer has not been successfully performed, the UE may attempt to retransmit the user data that the UE has desired to transmit. During this process, the UE may initiate a header compression context or attempt to transmit a full header packet.

The PDCP entity or RRC/NAS layer in the legacy system where the RoHC header compression protocol was performed at the PDCP layer has not been able to understand why a RoHC feedback packet is transmitted. In addition, it has not been defined in the legacy system when the RoHC feedback packet is transmitted. That is, in the prior art, since information related to the header compression is internally exchanged, an external entity cannot understand the information. However, according to the present invention, the header compression related information can be directly provided to the outside. Particularly, in the related art, the PDCP layer uses the user plane and is not affected by the amount of data transmission. However, in the Control plane CIoT solution, transmission of the RoHC feedback with information indicating a decoding failure at an MME to a UE may cause overhead. That is, compared to the structure where after generation of the RoHC feedback packet, the RoHC feedback packet is ciphered and then included in the NAS message, the structure where the NAS message includes only information indicating that an error has occurred during the header decompression process according to the present invention is advantageous in terms of simplicity.

Figure 15:
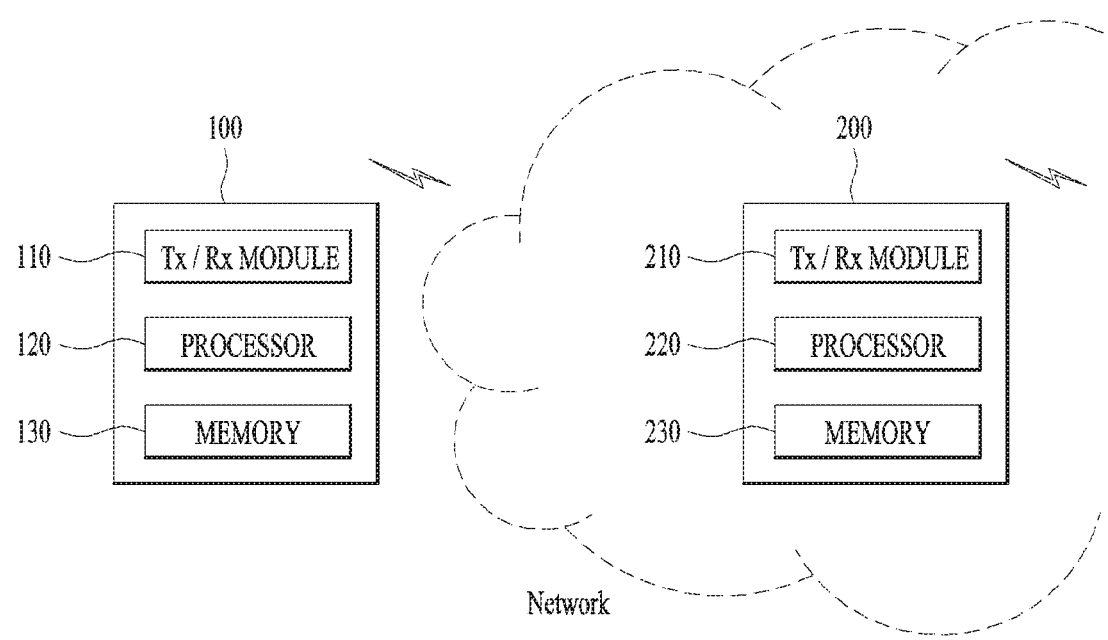
FIG. 15 illustrates a node according to an embodiment of the present invention.

FIG. 15 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 15, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:

1. A user equipment (UE) for transmitting data in a wireless communication system, the UE comprising:
a transceiver; and
a processor configured to control the transceiver, the processor configured to:
transmit, through the transceiver, user data with a compressed header in a non-access stratum (NAS) message;
receive, through the transceiver, a response indicating failure of header decompression of the compressed header; and
based on receiving the response, transmit a full header through the transceiver,
wherein the NAS message carrying the user data is a Service Request message, and the response is carried in a Service Reject message.

2. The UE according to claim 1, wherein the Service Reject message further comprises a cause value indicating the failure of the header decompression in addition to a cause value for service rejection.

3. The UE according to claim 1, wherein the user data is transferred from an evolved session management (ESM) entity of the UE to an evolved packet system mobility management (EMM) entity of the UE, and wherein the NAS message containing the user data is transmitted from the EMM entity.

4. The UE according to claim 1, wherein the full header is transmitted with new user data.

5. The UE according to claim 1, wherein the compressed header is generated by a NAS layer of the UE based on a header compression protocol.

6. The UE according to claim 5, wherein the header compression protocol is a robust header compression (RoHC) protocol.

7. A network node for receiving data in a wireless communication system, the network node comprising:
a transceiver; and
a processor configured to control the transceiver, the processor configured to:
receive, through the transceiver, user data with a compressed header in a non-access stratum (NAS) message from a user equipment (UE);
perform header decompression of the compressed header;
when no error occurs during the header decompression, transmit, through the transceiver, the user data to a serving gateway (S-GW); and
when an error occurs during the header decompression, transmit, through the transceiver, a response indicating failure of the header decompression to the UE instead of transmitting the user data to the S-GW,
wherein the NAS message carrying the user data is a Service Request message, and the response is carried in a Service Reject message.

8. The network node according to claim 7, wherein the Service Reject message further comprises a cause value indicating the failure of the header decompression in addition to a cause value for service rejection.

9. The network node according to claim 7, wherein the Service Reject message is an evolved packet system mobility management (EMM) message transmitted from an EMM entity of the network node.

10. The network node according to claim 7, wherein the network node is configured to receive a full header from the UE in response to the response.

11. The network node according to claim 10, wherein the full header is received together with new user data.

12. The network node according to claim 7, wherein the network node is a mobility management entity (MME).

13. The network node according to claim 12, wherein the header decompression is performed by a NAS layer of the MME based on a header compression protocol.

14. The network node according to claim 13, wherein the header compression protocol is a robust header compression (RoHC) protocol.

15. A method for transmitting data by a user equipment (UE) in a wireless communication system, the method comprising:
 transmitting user data with a compressed header in a non-access stratum (NAS) message;
 receiving a response indicating failure of header decompression of the compressed header; and
 based on receiving the response, transmitting a full header,
 wherein the NAS message carrying the user data is a Service Request message, and the response is carried in a Service Reject message.

16. A method for receiving data by a network node in a wireless communication system, the method comprising:
 receiving, from a user equipment (UE), user data with a compressed header in a non-access stratum (NAS) message;
 performing header decompression of the compressed header; and
 upon detecting an error during the header decompression, transmitting a response indicating failure of the header decompression to the UE instead of transmitting the user data to a serving gateway (S-GW),
 wherein the NAS message carrying the user data is a Service Request message, and the response is carried in a Service Reject message.

\* \* \* \* \*